United States Patent
Mittal et al.

(10) Patent No.: US 10,810,419 B2
(45) Date of Patent: *Oct. 20, 2020

(54) METHOD AND APPARATUS FOR UPDATING ROAD MAP GEOMETRY BASED ON RECEIVED PROBE DATA

(71) Applicant: HERE GLOBAL B.V., Eindhoven (NL)

(72) Inventors: Anish Mittal, Berkeley, CA (US); Mark David Tabb, San Francisco, CA (US); Himaanshu Gupta, Emeryville, CA (US); Yelena Perelmutova, Berkeley, CA (US); David Lawlor, Veldhoven (NL)

(73) Assignee: HERE Global B.V., Eindhoven (NL)

(*) Notice: Subject to any disclaimer, the term of this patent is extended or adjusted under 35 U.S.C. 154(b) by 181 days.

This patent is subject to a terminal disclaimer.

(21) Appl. No.: 15/860,249

(22) Filed: Jan. 2, 2018

(65) Prior Publication Data

US 2018/0144190 A1 May 24, 2018

Related U.S. Application Data

(63) Continuation of application No. 14/978,815, filed on Dec. 22, 2015, now Pat. No. 9,892,318.

(51) Int. Cl.
*G06K 9/00* (2006.01)
*G01C 21/32* (2006.01)
(Continued)

(52) U.S. Cl.
CPC ......... *G06K 9/00476* (2013.01); *G01C 21/32* (2013.01); *G01C 21/3676* (2013.01);
(Continued)

(58) Field of Classification Search
CPC .... G06K 9/00476; G06K 9/6215; G06K 9/52; G06K 2009/4666; G06T 7/60; G01C 21/3676
(Continued)

(56) References Cited

U.S. PATENT DOCUMENTS

| D366,871 S | 2/1996 | Richardson et al. |
| 5,948,043 A * | 9/1999 | Mathis ............... G01C 21/30 342/357.52 |

(Continued)

FOREIGN PATENT DOCUMENTS

| WO | WO 2010/069380 A1 | 6/2010 |
| WO | WO 2010/105935 A1 | 9/2010 |

(Continued)

OTHER PUBLICATIONS

CrowdAtlas: Self-Updating Maps for Cloud and Personal Use [online] [retrieved from the Internet Feb. 27, 2016]. Retrieved at URL: <http://web.eecs.umich.edu/~yinw/publication/mobisys13-final.pdf>. 14 pages.

(Continued)

*Primary Examiner* — Andrew M Moyer
(74) *Attorney, Agent, or Firm* — Alston & Bird LLP

(57) ABSTRACT

A method is provided for generating and revising map geometry based on a received image and probe data. A method may include: receiving probe data from a first period of time, where the probe data from a first period of time is from a plurality of probes within a predefined geographic region; generating a first image of the predefined geographic region based on the probe data from the first period of time; receiving probe data from a second period of time different from the first period of time, where the probe data from the second period of time is from a plurality of probes within the predefined geographic region; generating a second image (Continued)

based on the probe data from the second period of time; comparing the first image to the second image; and generating a revised route geometry based on changes detected between the first image and the second image.

14 Claims, 10 Drawing Sheets

(51) Int. Cl.
    *G09B 29/00*         (2006.01)
    *G01C 21/36*         (2006.01)
    *G06K 9/52*          (2006.01)
    *G06K 9/62*          (2006.01)
    *G06T 7/60*          (2017.01)
    *G06K 9/46*          (2006.01)

(52) U.S. Cl.
    CPC ............ *G06K 9/52* (2013.01); *G06K 9/6215* (2013.01); *G06T 7/60* (2013.01); *G09B 29/004* (2013.01); *G06K 2009/4666* (2013.01)

(58) Field of Classification Search
    USPC ........................................................ 382/113
    See application file for complete search history.

(56) References Cited

U.S. PATENT DOCUMENTS

| | | | |
|---|---|---|---|
| 6,922,157 B2 | 7/2005 | Kimura | |
| 7,912,879 B2 | 3/2011 | Witmer | |
| 8,949,021 B2 | 2/2015 | Witmer | |
| 9,068,849 B2 | 6/2015 | Witmer | |
| 9,222,786 B2 | 12/2015 | Witmer | |
| 9,892,318 B2 * | 2/2018 | Mittal | G01C 21/3676 |
| 2006/0041375 A1 | 2/2006 | Witmer et al. | |
| 2007/0032946 A1 * | 2/2007 | Goto | G01C 21/32 701/93 |
| 2009/0144030 A1 | 6/2009 | Witmer | |
| 2009/0144031 A1 | 6/2009 | Witmer | |
| 2009/0144331 A1 | 6/2009 | Witmer | |
| 2009/0228204 A1 | 9/2009 | Zavoli et al. | |
| 2011/0125811 A1 | 5/2011 | Witmer | |
| 2011/0216935 A1 | 9/2011 | Mays et al. | |
| 2011/0276592 A1 | 11/2011 | Gautama et al. | |
| 2012/0116678 A1 | 5/2012 | Witmer | |
| 2012/0121206 A1 | 5/2012 | Witmer | |
| 2012/0277985 A1 | 11/2012 | Witmer | |
| 2013/0030690 A1 | 1/2013 | Witmer | |
| 2014/0372022 A1 | 12/2014 | Witmer | |
| 2015/0221216 A1 | 8/2015 | Stenneth et al. | |
| 2015/0319825 A1 * | 11/2015 | Destine | H05B 37/0227 315/153 |

FOREIGN PATENT DOCUMENTS

| | | |
|---|---|---|
| WO | WO 2011/023247 A1 | 3/2011 |
| WO | WO-2011/047729 A1 | 4/2011 |

OTHER PUBLICATIONS

International Search Report and Written Opinion of the International Search Authority for International Patent Application No. PCT/EP2016/081770, dated Apr. 24, 2017, 14 pages.

Office Action for U.S. Appl. No. 14/978,815, dated May 5, 2017, 21 pages.

Notice of Allowance for U.S. Appl. No. 14/978,815 dated Oct. 4, 2017.

* cited by examiner

METHOD AND APPARATUS FOR UPDATING ROAD MAP GEOMETRY BASED ON RECEIVED PROBE DATA

CROSS-REFERENCE TO RELATED APPLICATIONS

This application is a continuation of and claims priority to U.S. patent application Ser. No. 14/978,815, filed on Dec. 22, 2015, the contents of which are herein incorporated by reference in their entirety.

TECHNOLOGICAL FIELD

An example embodiment of the present invention relates to map generation and revision and, more particularly, to revising map geometry based on probe data received over two different periods of time.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. However, map features such as roadways and routes along roadways change with relative frequency and mapping services may struggle to keep up with the map feature changes considering there are millions of miles of roads and thousands of road projects altering traffic routes on a constant basis.

BRIEF SUMMARY

A method, apparatus, and computer program product are provided in accordance with an example embodiment for revising map geometry based on probe data received over at least two different periods of time for a specific geographic region. In an example embodiment, a method is provided that includes: receiving probe data from a first period of time, where the probe data from a first period of time is from a plurality of probes within a predefined geographic region; generating a first image of the predefined geographic region based on the probe data from the first period of time; receiving probe data from a second period of time different from the first period of time, where the probe data from the second period of time is from a plurality of probes within the predefined geographic region; generating a second image of the predefined geographic region based on the probe data from the second period of time; comparing the first image to the second image; and generating a revised route geometry based on changes detected between the first image and the second image.

According to some example embodiments, generating a revised route geometry model based on changes detected between the first image and the second image may include: eliminating routes appearing on the first image but failing to appear on the second image; adding routes appearing on the second image but failing to appear on the first image; and retaining routes that appear on both the first image and the second image. The probe data from the first period of time used to generate the first image and the probe data from the second period of time used to generate the second image are each filtered to remove probe data having a speed below a predetermined level. Comparing the first image to the second image may include generating a differential image including a delta between the first image and the second image. Methods may optionally include performing a connected component analysis on the differential image and eliminating components from the differential image failing to satisfy the connected component analysis to within a predetermined amount. Methods may include performing a morphological image processing function on the differential image to connect broken clusters of pixels within the differential image. Generating the first image based on the probe data from the first period of time may include determining a number of probe data points corresponding to a pixel and presenting the pixel in a first hue in response to the number of probe data points being above a predefined threshold, and presenting the pixel in a second hue in response to the number of probe data points being below the predefined threshold.

Example embodiments of the present invention may provide an apparatus including at least one processor and at least one memory including computer program code. The at least one memory and computer program code may be configured to, with the processor, cause the apparatus to at least: receive probe data from a first period of time, where the probe data from a first period of time may be from a plurality of probes within a predefined geographic region; generate a first image of the predefined geographic region based on the probe data from the first period of time; receive probe data from a second period of time different from the first period of time, where the probe data from the second period of time may be from a plurality of probes within the predefined geographic region; generate a second image of the predefined geographic region based on the probe data from the second period of time; compare the first image to the second image; and generate a revised route geometry based on changes detected between the first image and the second image.

According to some example embodiments, causing the apparatus to generate a revised route geometry model based on changes detected between the first image and the second image may include causing the apparatus to: eliminate routes appearing on the first image but failing to appear on the second image; add routes appearing on the second image but failing to appear on the first image; and retain routes appearing on both the first image and the second image. The probe data from the first period of time used to generate the first image and the probe data from the second period of time used to generate the second image may each be filtered to remove probe data having a speed below a predetermined level. Causing the apparatus to compare the first image to the second image may include causing the apparatus to generate a differential image including a delta between the first image and the second image. The apparatus may further be caused to perform a connected component analysis on the differential image and causing the apparatus to eliminate components from the differential image failing to satisfy the connected component analysis within a predetermined amount. An apparatus of example embodiments may further be caused to perform a morphological image processing function on the differential image to connect broken clusters of pixels within the differential image. Causing the apparatus to generate the first image based on the probe data from the first period of time may include causing the apparatus to determine a number of probe data points corresponding to a pixel and causing the apparatus to present the pixel in a first hue in response to the number of probe data points being above a predefined threshold and causing the apparatus to present the pixel in a second hue in response to the number of probe data points being below the predefined threshold.

Example embodiments of the present invention may provide a computer program product including at least one non-transitory computer-readable storage medium having computer-executable program code portions stored therein. The computer-executable program code portions comprising program code instructions configured to: receive probe data from a first period of time, wherein the probe data from a first period of time is from a plurality of probes within a predefined geographic region; generate a first image of the predefined geographic region based on the probe data from the first period of time; receive probe data from a second period of time different from the first period of time, wherein the probe data from the second period of time is from a plurality of probes within the predefined geographic region; generate a second image of the predefined geographic region based on the probe data from the second period of time; compare the first image to the second image; and generate a revised route geometry based on changes detected between the first image and the second image.

According to some example embodiments, the program code instructions configured to compare the first image to the second image may include program code instructions configured to: generate a first route geometry model for the first image; generate a second route geometry model for the second image; and determine a difference between the first route geometry model and the second route geometry model. The program code instructions configured to generate a revised route geometry based on changes detected between the first image and the second image may include program code instructions configured to: eliminate routes appearing on the first image but failing to appear on the second image; add routes appearing on the second image, but failing to appear on the first image; and retain routes appearing on both the first image and the second image. The probe data from the first period of time used to generate the first image and the probe data from the second period of time used to generate the second image may each be filtered to remove probe data having a speed below a predetermined level.

According to some example embodiments, the program code instructions configured to compare the first image to the second image may include program code instructions configured to generate a differential image including a delta between the first image and the second image. Example embodiments may include program code instructions configured to perform a connected component analysis on the differential image and program code instructions configured to eliminate components from the differential image failing to satisfy the connected component analysis to within a predefined amount. The computer program product of some examples may include program code instructions configured to perform a morphological image processing function on the differential image to connect broken clusters of pixels within the differential image.

In another example embodiment, an apparatus is provided that includes: means for receiving probe data from a first period of time, where the probe data from a first period of time is from a plurality of probes within a predefined geographic region; means for generating a first image of the predefined geographic region based on the probe data from the first period of time; means for receiving probe data from a second period of time different from the first period of time, where the probe data from the second period of time is from a plurality of probes within the predefined geographic region; means for generating a second image of the predefined geographic region based on the probe data from the second period of time; means for comparing the first image to the second image; and means for generating a revised route geometry based on changes detected between the first image and the second image. The means for comparing the first image to the second image may include: means for generating a first route geometry model for the first image; means for generating a second route geometry model for the second image; and means for determining a difference between the first route geometry model and the second route geometry model.

According to some example embodiments, the means for generating a revised route geometry model based on changes detected between the first image and the second image may include: means for eliminating routes appearing on the first image but failing to appear on the second image; means for adding routes appearing on the second image but failing to appear on the first image; and means for retaining routes that appear on both the first image and the second image. The probe data from the first period of time used to generate the first image and the probe data from the second period of time used to generate the second image are each filtered to remove probe data having a speed below a predetermined level. The means for comparing the first image to the second image may include means for generating a differential image including a delta between the first image and the second image. The apparatus may optionally include means for performing a connected component analysis on the differential image and means for eliminating components from the differential image failing to satisfy the connected component analysis to within a predetermined amount. The apparatus may optionally include means for performing a morphological image processing function on the differential image to connect broken clusters of pixels within the differential image. The means for generating the first image based on the probe data from the first period of time may include means for determining a number of probe data points corresponding to a pixel and presenting the pixel in a first hue in response to the number of probe data points being above a predefined threshold, and means for presenting the pixel in a second hue in response to the number of probe data points being below the predefined threshold.

BRIEF DESCRIPTION OF THE DRAWINGS

Figure 1:
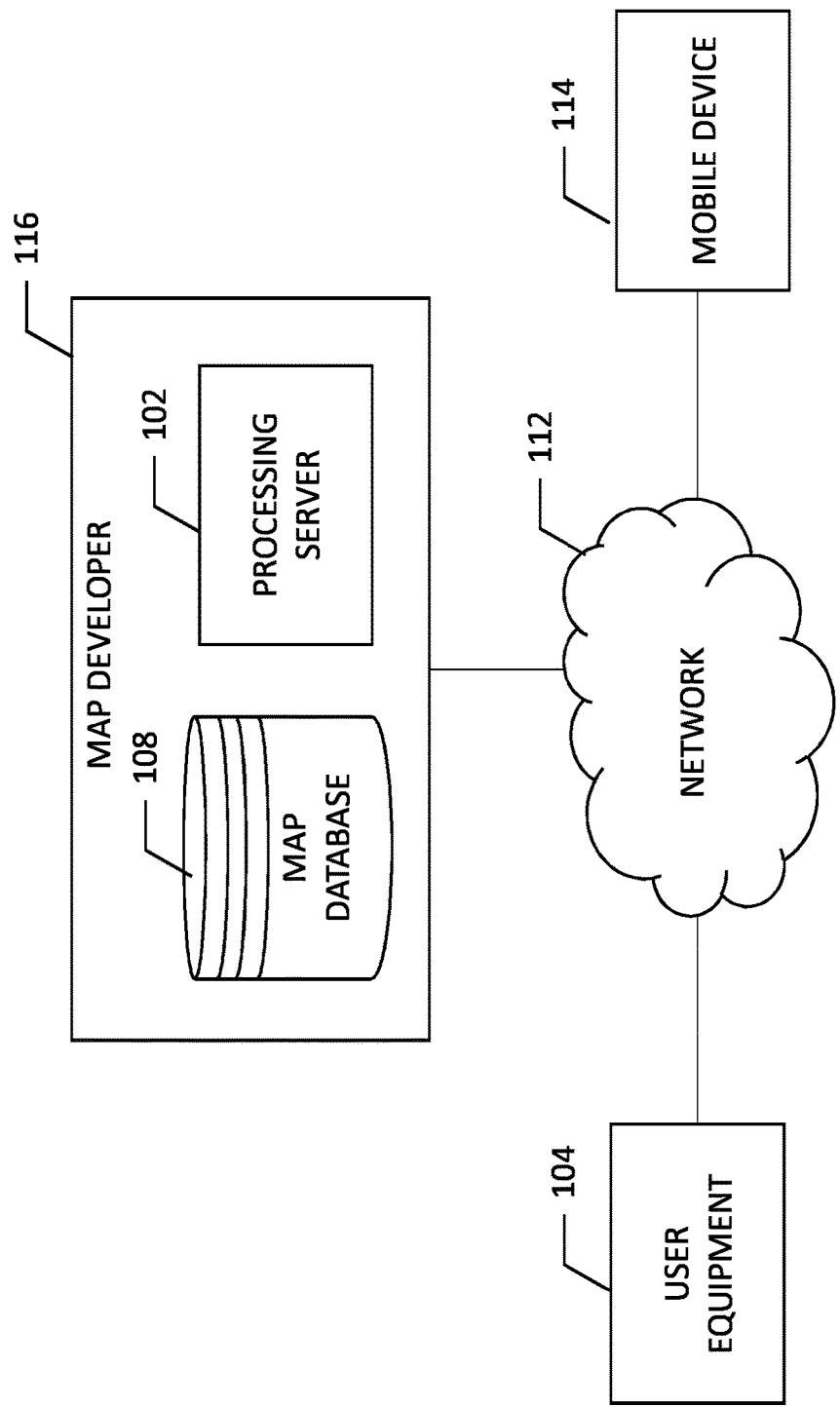
Figure 2:
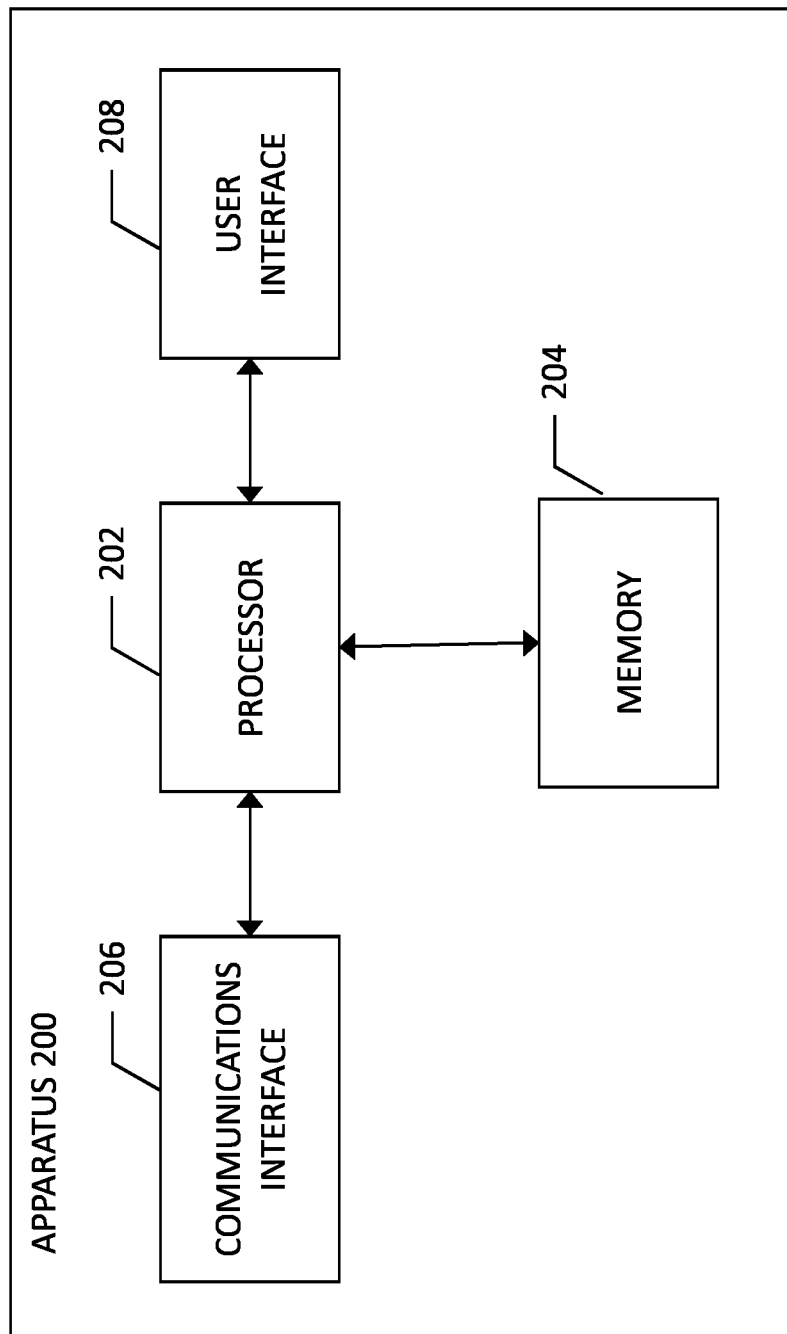
Figure 3:
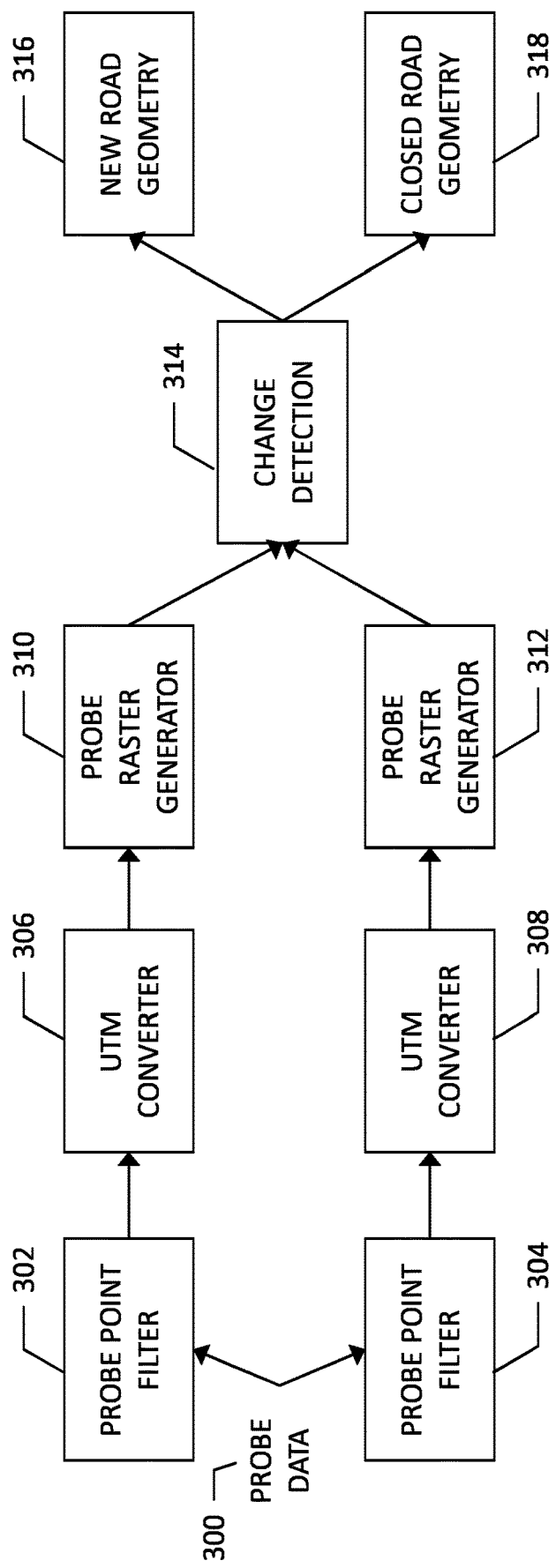
Figure 4:
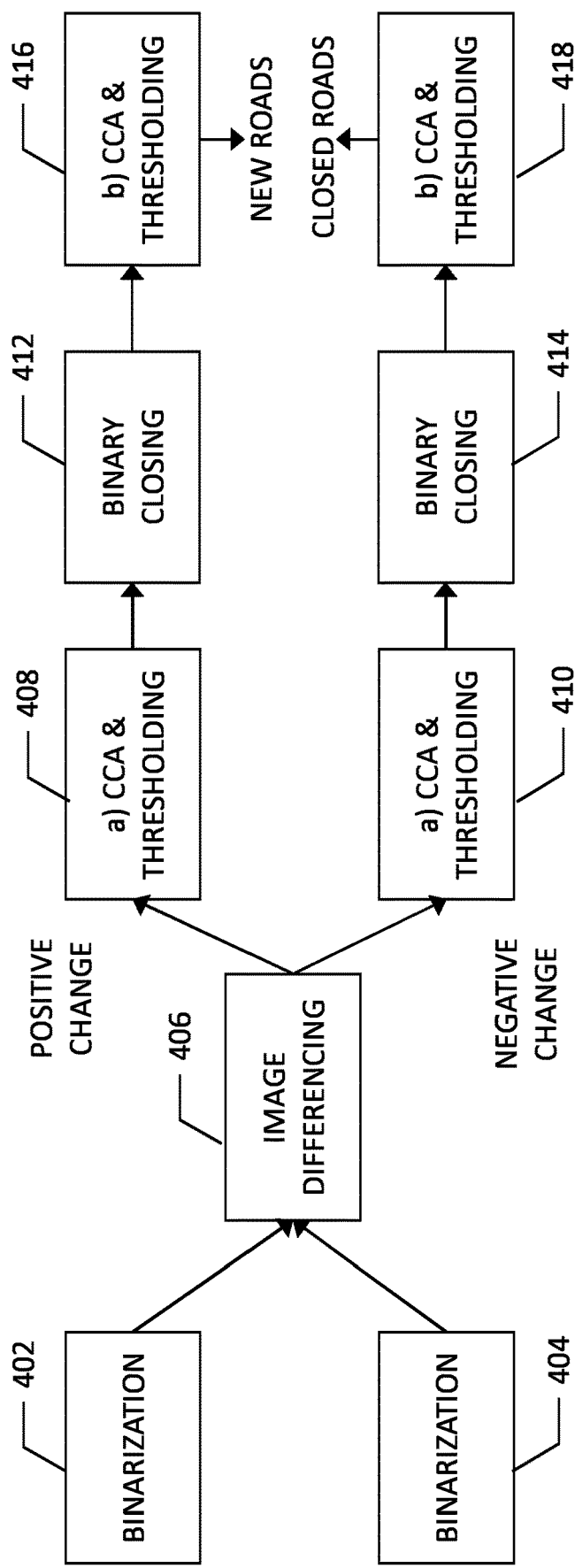
Figure 5:
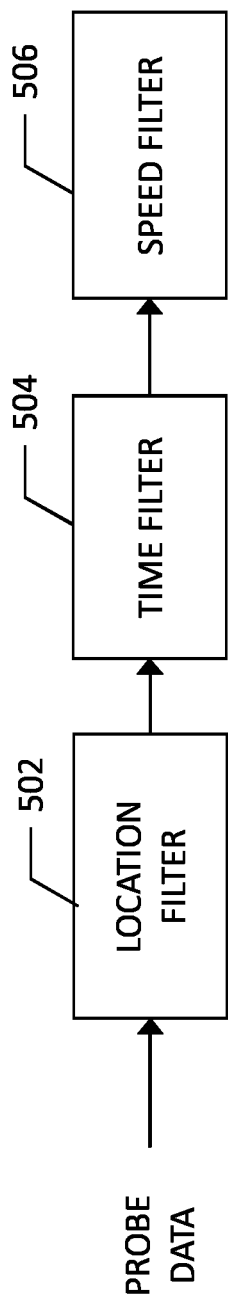

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating and revising map geometry based on a received probe data in accordance with an example embodiment of the present invention;

FIG. 3 illustrates a flowchart depicting the interpretation of probe data to add or remove road geometry from a map database according to an example embodiment of the present invention;

FIG. 4 illustrates a flowchart depicting the change detection operation of FIG. 3 according to an example embodiment of the present invention;

FIG. 5 illustrates a flowchart depicting a process for filtering probe data according to an example embodiment of the present invention.

Figure 6:
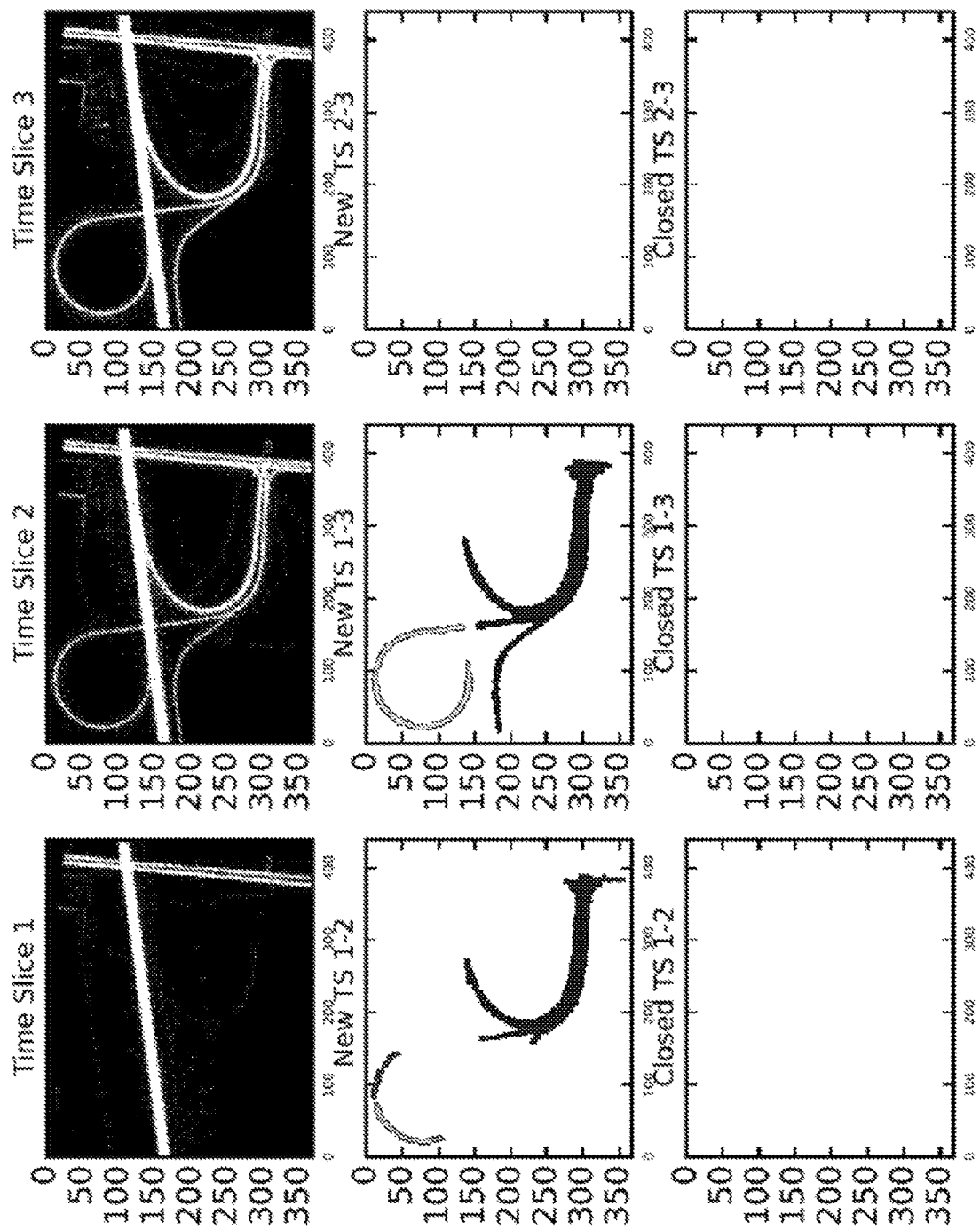
Figure 7:
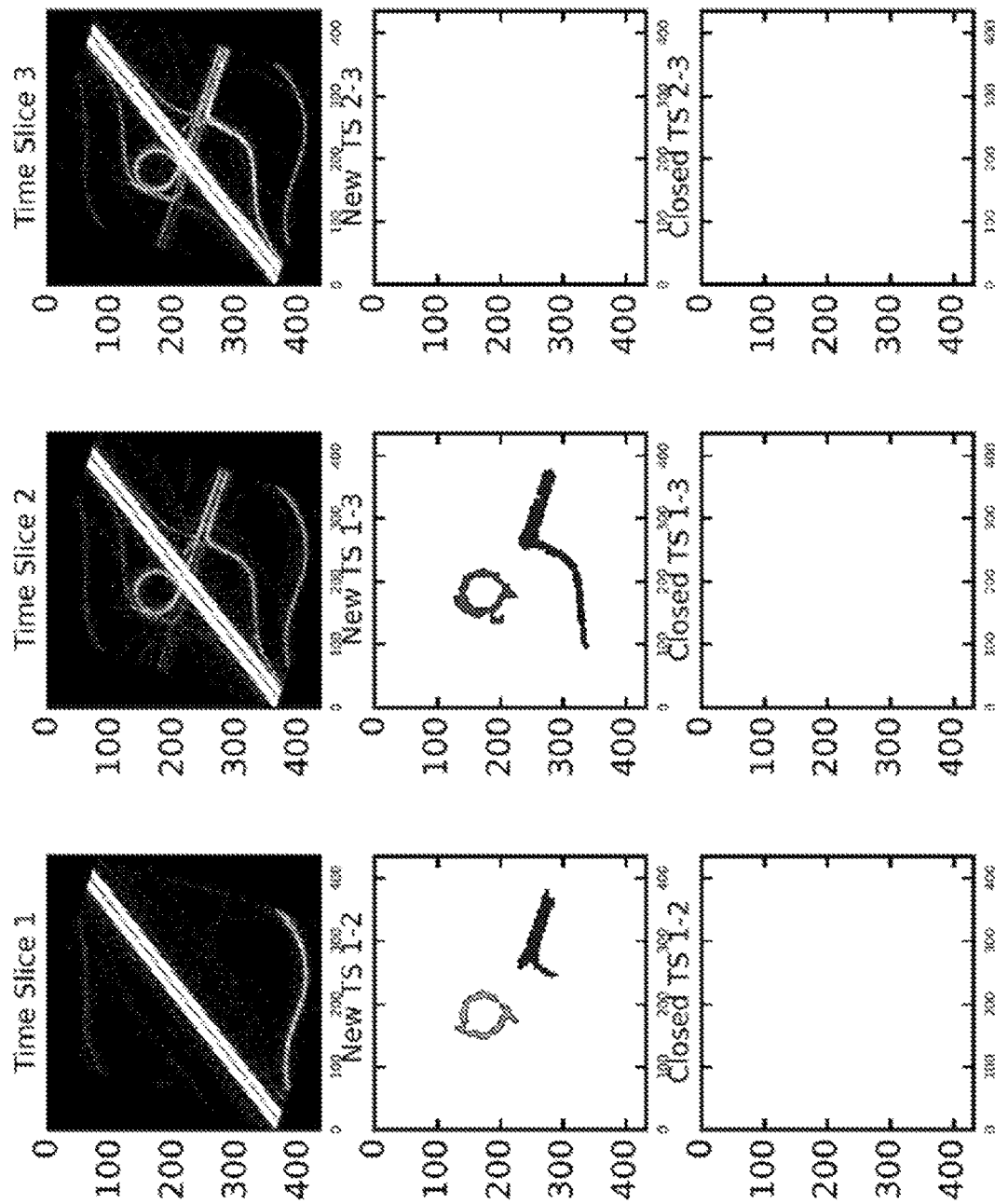
Figure 8:
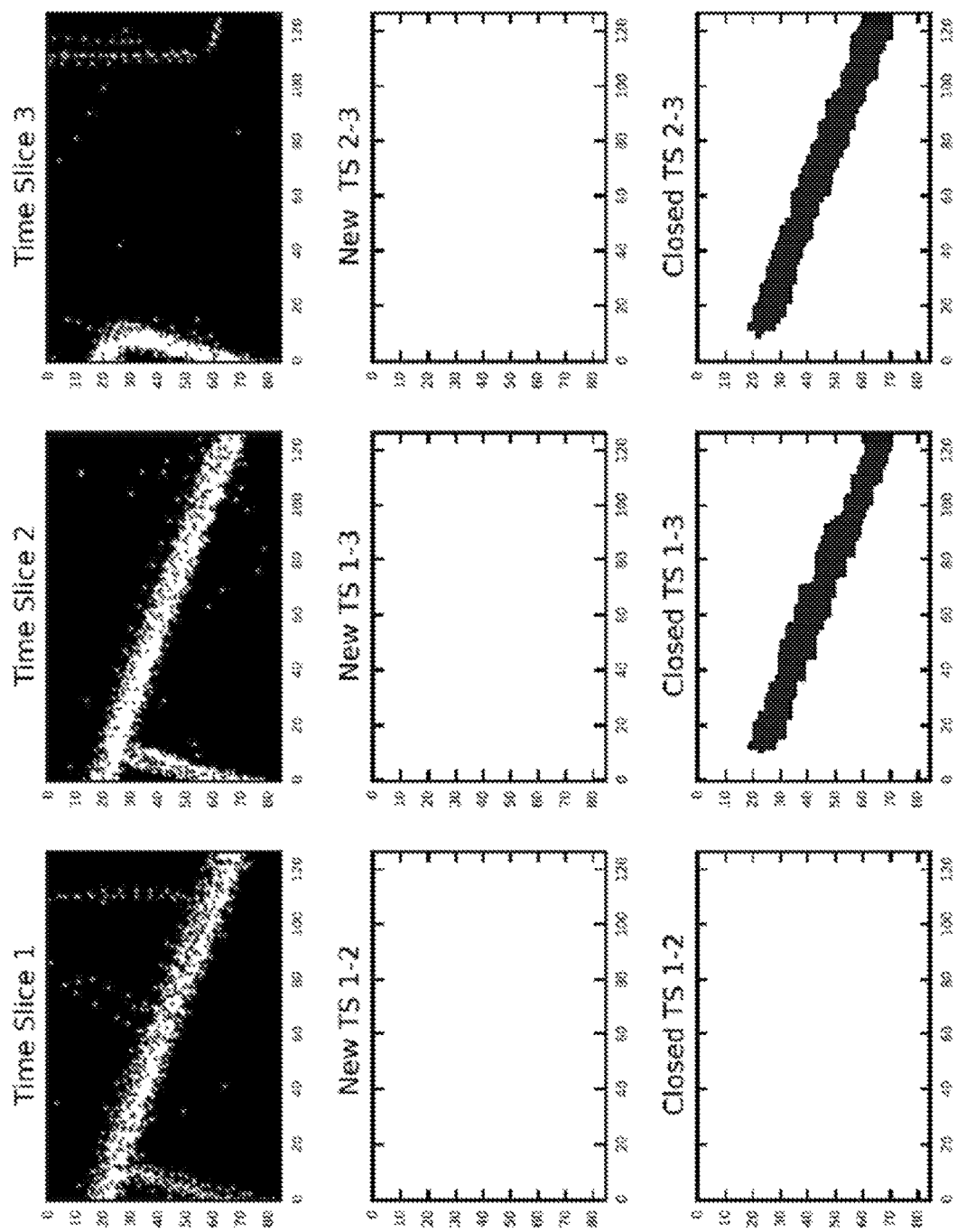
Figure 9:
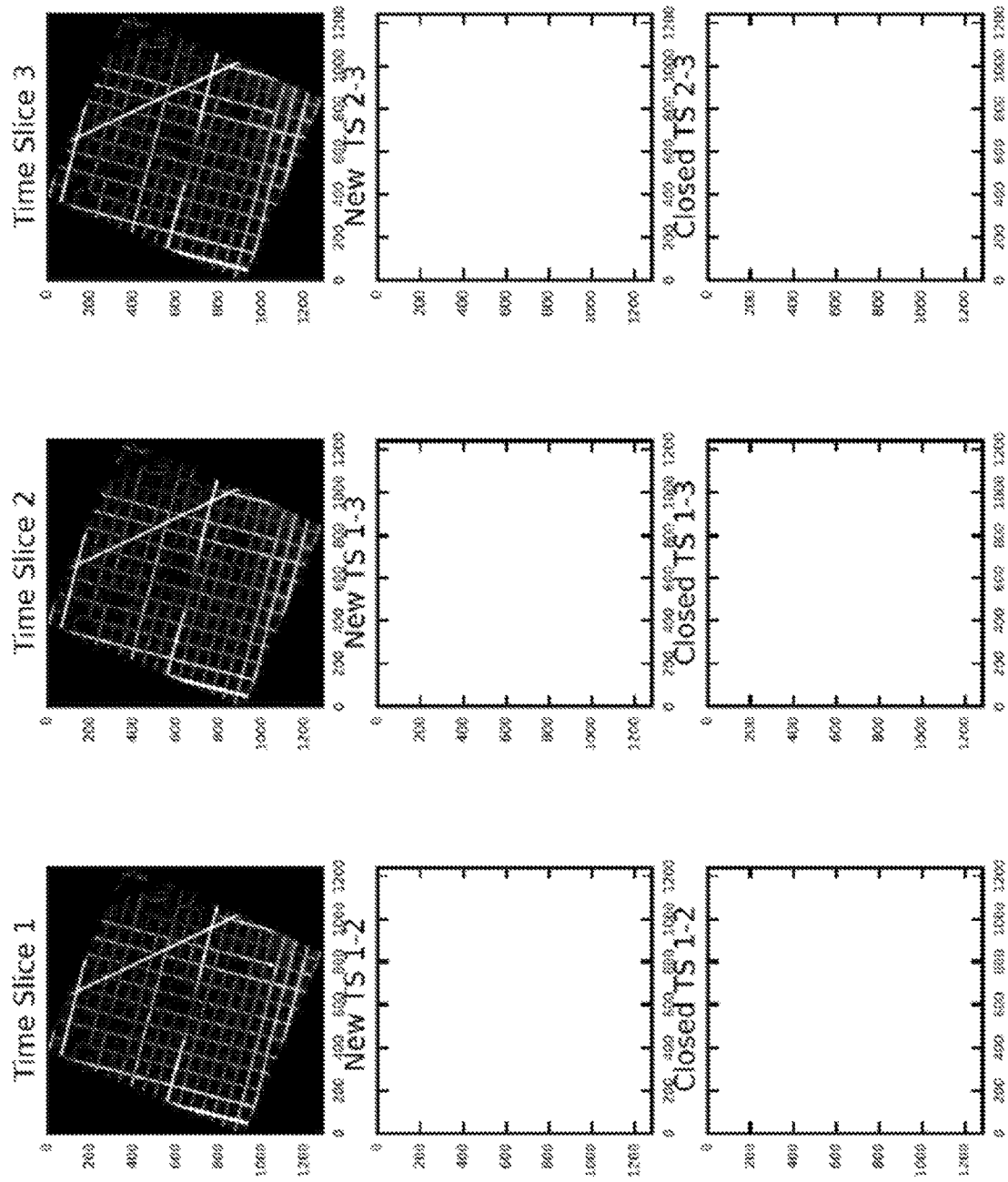
Figure 10:
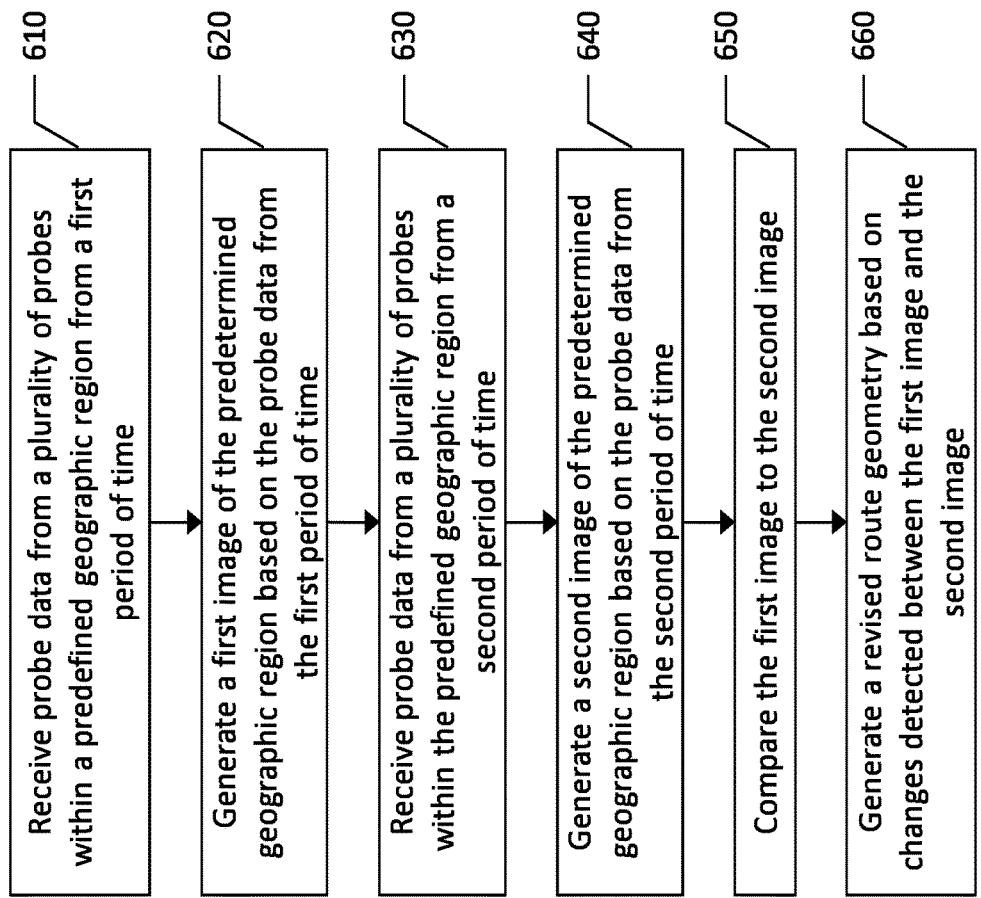

FIG. 6 illustrates an array of images including the binary rasterized images generated from the probe data for first, second, and third periods of time, along with the images generated through the change detection logic of FIG. 4;

FIG. 7 illustrates another array of images including the binary rasterized images generated from the probe data for first, second, and third periods of time, along with the images generated through the change detection logic of FIG. 4;

FIG. 8 illustrates another array of images including the binary rasterized images generated from the probe data for first, second, and third periods of time, along with the images generated through the change detection logic of FIG. 4;

FIG. 9 illustrates still another array of images including the binary rasterized images generated from the probe data for first, second, and third periods of time, along with the images generated through the change detection logic of FIG. 4; and FIG. 10 is a flowchart of a method for revising map geometry based on images generated through probe data collection for a specific geographic region over two distinct periods of time according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for revising map geometry based on probe data received over a plurality of distinct time periods. FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for revising map geometry based on probe data received over two different periods of time. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for revising map information (e.g., stored in map database 108) using probe data (e.g., from mobile device 114) from a plurality of vehicles traveling along one or more roadways in a particular geographic region. Map information, such as paths of roadways, direction of traffic on said roadways, intersections, and the like may be stored, for example, in map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths.

Example embodiments described herein provide a mechanism to change roadway geometry using probe data to generate images of a specific geographic region for two distinct time periods, and to use the images generated to determine if there is a change in the roadway geometry between the two distinct time periods. The method described herein compares images generated with recent probe data with images generated with past probe data such that the methods of example embodiments of the present invention are not susceptible to the inaccuracies that may manifest due to conventional map making techniques and are less computationally intensive than matching individual probe data points with existing map geometries and tracking changes using probe data points that do not match existing mapped roadways. The approach described herein looks only at the differences in images generated by probe data that correspond to road geometry changes. Probe data from parking lots, gas stations, etc., are filtered out, as is noisy probe data that can be problematic in topographies such as urban canyons among tall buildings. The shape and locations of road geometry changes are localized allowing secondary algorithms to be applied to the localized area on a limited amount of probe data to obtain vector road geometry that accurately reflects the current roadway paths. Embodiments as described below are computationally more efficient than conventional map updating processes as the algorithmic analysis is performed on image rasters and not on probe points. Hence, the computational complexity is dependent on the size of the raster image (which can be tightly controlled) and not on the number of probe data points (which can be substantial and is not subject to control).

Example embodiments of the present invention provide road geometry changes based on raster images generated through probe data collection over two or more periods of time. Probe data from a first period of time related to a geographic region is collected and used to generate a first rasterized image of the geographic region. Probe data from a second period of time related to the same geographic region is collected and used to generate a second rasterized image of the geographic region. The period of time may be hours, days, weeks, or months, for example. The duration of the period may be dependent upon the density of probe data that is received within the geographic region or along a road within the geographic region. For example, in a region with a heavily-traveled interstate highway, the period may be a matter of hours or days since the probe data may accumulate rapidly. A sparsely-traveled rural route may have a time period of weeks or months to accumulate sufficient probe data to generate an image of the roadway in question. Once the first and second rasterized images are generated, they may be compared against one another to determine changes of the roadways in the geographic region between the two different periods of time.

Example embodiments described herein provide a more efficient and accurate way to update road geometries in a geographic region since probe data is used only to produce an image raster and all analysis of the roadway geometry is done on the rasterized images themselves. Hence, the complexity of the algorithm is dependent upon the number of pixels on the raster image instead of the number of probe points. The resolution of the raster may be dependent upon the number of pixels per meter, which may be a variable parameter within the algorithm. For example, one pixel of the first or second rasterized image may represent two meters according to some embodiments.

Further, example embodiments provide increased efficiency in revising map routes since map matching of all of the probe data points are not individually considered or compared. An assumption may be made that at a given instant in time a map is fresh (i.e., accurately represents the current state of the roadways) and aligned with the probe data. Changes to the probe data may be determined thereafter. As such, the need to map match each probe data point is eliminated.

The comparison between the first rasterized image from the first period of time and the second rasterized image from the second period of time, for example, by processing server 102, may identify only those areas of the images that include changes. For example, as will be described further below, if a second image is unchanged from a first image, then no map updates are necessary. However, if a section of roadway is altered between the images, for example, if a stretch of roadway is no longer present in the probe data represented by the second image, then that stretch of roadway may be eliminated from the map geometry. Only the changes between the images need to be considered in the map data updates communicated by processing server 102 to the map database 108.

According to example embodiments described herein, the disclosed algorithms model the roadway geometry within a geographic region in a first time period and a second time period, and determine a change between the geometries of the two distinct time periods. Methods may identify a geographic region that is to be analyzed for changes in roadway geometry. A latitude and longitude for the area may be provided, with the region being an area centered at the specified latitude and longitude, where the area is a specified shape such as a circle or square. The identification of the geographic region may be provided via user interface 208 to processor 202 of apparatus 200, for example. Optionally, a series of boundary coordinates may be provided that define the geographic region, and/or a size of the region may optionally be defined. This geographic region may be an input entered by a user for manual identification of the region (e.g., at user interface 208), or regions may be periodically identified for analysis to determine if a change in roadway geometry has occurred through an automated period polling of geographic regions. A time window (e.g., a first time period and/or second time period) may be established based on manual input via user interface 208, or according to an automated embodiment, the time window may be established based on the prior analysis of the particular geographic region, such as via processor 202.

Probe data may be collected over the specified time window. According to some embodiments, probe data may be routinely collected for a geographic region and stored (e.g., in memory 204) for a predetermined period of time (e.g., one week, 30 days, 90 days, 1 year, etc.). This probe data (e.g., from mobile device 114) may be collected on an on-going basis, or collected only in response to a request for data collection. The probe data collected may be collected according to a set of predefined criteria configured to minimize errors in the establishment of road geometries. For example, probe data that includes speed, heading, location, etc. may be analyzed to determine if the probe data meets the necessary criteria for inclusion in the raster image of the period of time in which the probe data was collected. The criteria may include a speed criterion, such as a speed threshold that must be exceeded (e.g., probe data must indicate a speed greater than 20 kilometers per hour) to eliminate probe data from vehicles making maneuvers (e.g., turns) at an intersection or vehicles in parking lots, for example. While eliminating probe data points collected below a threshold vehicle speed may eliminate the collection of certain aspects of road geometry data, algorithms as described herein may include hole-filling algorithms to join any disconnected portions of the roadway geometry identified by the probe data points used to generate the rasterized image. Optionally, all probe data may be collected and stored at memory 204, and the collected probe data may subsequently be filtered, e.g., via processor 202, to obtain the filtered probe data relevant to a specific geographic region for a specific period of time, as further described below.

The length of time or duration of the time periods used for generation of the rasterized images may be determined based on a functional class of the roadways within the geographic region. For example, a functional class of an urban arterial roadway that has relatively high traffic flow may have a relatively short duration time period (e.g., two days), while a relatively low-traffic rural local roadway may have a relatively long time period (e.g., two weeks). The duration of time periods may be as short as a few hours in the instance of a principal arterial road such as a busy interstate highway, while a rural minor local road may require a month or more duration for a period of probe data collection.

Probe data that is continuously collected may be collected and stored or buffered for a period of time, such as for 30, 60, 90 days, a year, or longer. This collected data may be discarded after the period of time ends, while new data continues to be collected, such that the buffer includes data for the predetermined period of time. This data may be used for establishing roadway geometry changes through the application of a first time window and a second time window. The first time window may be a period of time (e.g., hours or days for heavily traveled roads, or weeks or months for sporadically traveled roads), and the second period of time may be the same duration or may be different (e.g., if a road is sporadically traveled in the first window, but heavily traveled in the second window, such as seasonal roads). These windows or periods of time may be separated by a predefined amount of time. The time between the first window and the second window may be established based on a desired precision with which change detection is desired. For example, if the precise date of a roadway geometry change is desired, the time between the first time window and the second time window may be established as between 12 and 24 hours. Whereas if the precise day of the roadway geometry change is not necessary, the time between the first time window and the second time window may be a longer period of time, such as two weeks. Further, the time between the first window of time and the second window of time may be adjusted based on the length of time of the time windows required to obtain sufficient data. When a time window is on the order of several weeks in order to accumulate sufficient data to accurately represent a roadway geometry, it may not be desirable to have a period between the first window and the second window of time of less than a week. The amount of time between a first time window and a second time window may be manually adjustable, or it may be automatically determined based upon the duration of the first time window and/or second time window.

Once the location of the geographic region and the time periods are determined, probe data including the speed, heading, and time may be collected corresponding to the time periods, filtered as appropriate, and used to generate a raster image. The latitude-longitude may be converted, via processor 202, to UTM (Universal Transverse Mercator) coordinates as UTM-x and UTM-y which may make the analysis space linear. The probe data with UTM coordinates may then be stored in memory 204. Pixels per meter may be selected or predefined based on a variety of factors. For example, in a high-density intersection or convoluted interstate interchange, a higher-resolution image may be desirable to more accurately represent the road geometry, while in a rural setting with few intersections and long stretches of roads, a lower resolution may be acceptable. An example pixel density may include two meters per pixel, for example. However, the pixel density may be manually adjustable or automatically adjustable to vary the resolution of an image as needed in dependence on roadway geometries and density of roadways in a geographic region.

For each period of time, a complete rasterized image may be generated, such as by processor 202, and a comparison may then be made between the two rasterized images to determine the changes between the image corresponding to the first time period and the image corresponding to the second time period. A differenced image may be generated by processor 202 illustrating the delta between the first image and the second image. A connected component analysis may be performed by the processor 202 on the differenced image and small components, such as components having fewer pixels than a threshold value, that may manifest due to noise may then be discarded. A threshold value may be established below which disconnected components may be determined as noise and discarded. For example, a value of 25 pixels may be used.

According to some embodiments, a morphological closing may be performed to connect broken clusters that belong to what is established to be a roadway geometry. While the structured elements of the morphological closing may be established as virtually any size in dependence of the data density, the roadway geometry, the roadway geometry density, according to an example embodiment, structured elements of nine pixels by nine pixels may be used for this analysis. A connected component analysis may again be performed such that any portions of the differenced image that did not merge with any roads during the morphological hole-filling process may be analyzed to determine if they should be discarded. During the second connected component analysis, a more conservative threshold pixel value may be used, such as 200 pixels, for example. While 200 pixels is given as an example, any threshold pixel value may be used; however, it may be desirable to use a threshold that is more conservative in the second connected component analysis than in the first connected component analysis in order to avoid inadvertently discarding good probe data as noise.

FIGS. 3-5 illustrate flowcharts illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 illustrates a flowchart depicting a method of gathering probe data to inform changes to roadway geometry of map data stored, for example, in map database 108. Probe data may be collected at 300 from a plurality of probes (e.g., mobile devices 114) while resident in a specified geographic region. The probe data is then processed through probe point data filters 302 and 304, such as a time filter for the appropriate period, a location filter for the appropriate geographic region, and a speed filter to eliminate potential noise, e.g., using processor 202. Probe point data filter 302 represents the processing path of probe data from a first time period, while probe point data filter 304 represents the processing path of probe data from a second time period. While the processing paths of the flowchart of FIG. 3 are shown as separate, each may be implemented in a single apparatus, such as apparatus 200. The probe point data that remains after filtering at 302 and 304 may then go on to a coordinate converter where the coordinates of the probe data, which may be initially received in GPS coordinates such as latitude and longitude are converted to UTM coordinate data at 306 for the first time period, and 308 for the second time period, such as by processor 202. The UTM-x and UTM-y coordinate probe data may then be used to generate an image through probe raster generators 310 and 312. These generators produce a rasterized image of the probe data according to the UTM coordinates. The two images, one from the probe raster generator 310 of the first time period, and a second from the probe raster generator 312 of the second time period, are compared at change detection operation 314. This change detection may be through the analysis described above, at which time road geometry that is determined to be new may be added at 316, such as a new roadway geometry path, while a roadway geometry that is determined to no longer receive traffic through a lack of probe data may be eliminated at 318.

FIG. 4 depicts a flowchart of the operations involved in the Change Detection operation 314 of FIG. 3. The rasterized image generated from the probe data from the first time period at 310 undergoes binarization at 402, where the pixels are established with binary distinction as either having probe data or lacking probe data at the location in the geographic region represented by the pixel. Similarly, the rasterized image generated from the probe data from the second time period at 3122 undergoes binarization at 404. At 406, the image differencing operation occurs where a pixel from the first binary rasterized image is compared with a corresponding pixel of the second binary rasterized image. Positive changes (e.g., changes in which a pixel or region of pixels of the second time period image are determined to have probe data where probe data was absent in the first time period image) proceed along one path, beginning at 408, while negative changes (e.g., changes in which a pixel or region of pixels of the second time period lack probe data while the pixel or region of pixels of the first time period did have probe data) proceed along another path beginning at 410.

In either case, a positive change or a negative change, the pixels of the image undergo connected component analysis at 408 and 410 to eliminate pixels that are determined to be unconnected. Further, thresholding is performed, for example by processor 202, at 408 and 410 to remove noise, where a first stage of thresholding may be performed with a liberal threshold (e.g., a lower threshold such as 25 pixels). This thresholding operation may eliminate noise through the removal of probe data in regions that are presumed to be noise due to the binary disposition of the pixels around them. Binary closing is performed on both positive changes and negative changes at 412 and 414, respectively. The binary closing operations merge broken segments of roadway geometry in order to obtain continuous roadway geometries within the revised map geometry. A second connected component analysis and thresholding operation may occur along each path at 416 and 418, where a second thresholding stage may be more conservative (e.g., a higher threshold such as 200 pixels). The higher thresholding is feasible since the binary closing operation is already performed resulting in minimal loss of real, accurate probe data. The negative change path results in roadway geometries being eliminated from the map geometry stored in map database 108, representing closed roads, while the positive change path results in roadway geometries being added to the map geometry representing new roads.

The probe data 300 of FIG. 3 may be filtered before processing in order to ensure the probe data is representative of the desired probe data. For example, probe data should be from within the geographic region of interest, from the time period of interest, and be from a vehicle determined to be traveling along a roadway. In order to filter the probe data, a number of individual filters may be applied to the probe data. FIG. 5 illustrates a flowchart of probe data filters according to an example embodiment described herein. The probe data filtering may be performed by processing server 102, such as using a processor 202 of apparatus 200. The probe data is received at a location filter 502 in which the location is established through the location information contained in the probe data. The probe data from a geographic area outside of the geographic region of interest is discarded, and the remaining probe data is exclusively from within the geographic region of interest. A time filter may then be applied to the probe data at 504. The time filter may use the two time periods as the filter criteria, filtering out all probe data that is not within either the first time period or the second time period. The probe data may also be separated into probe data from the first time period and probe data from the second time period. A speed filter 506 may then be applied to filter out potential sources of noise in the probe data. For example, probe data with a speed below a certain predefined level (e.g., 20 kilometers per hour) may be filtered out and omitted from the probe data used to generate the rasterized images. The probe data remaining after the filters of FIG. 5 are applied may then be established as in the appropriate location, at the appropriate time, and above the threshold speed to be used for the rasterized images.

FIGS. 6-10 illustrate example embodiments of the images generated in probe raster generators 310 and 312. Each of FIGS. 6-10 include three columns of images, and three rows of images. Each column represents a different time period. While three images from three time periods are depicted, example embodiments described herein require images from only two time periods in order to determine the distinction between a first time period and a second time period. The third column representing the third time period of example embodiments described with respect to FIGS. 6-10 is provided to illustrate a confirmation time period that may be implemented to confirm that a roadway geometry change was incorporated correctly into the map database 108, or that a roadway geometry has not changed between the first, second, or third time periods. The first row of images of each of FIGS. 6-10 depict the binary rasterized image from the generators 310, 312. The second row of images of each of FIGS. 6-10 depict the images resulting from the positive change path of FIG. 4, in which new roadway geometries are added. The third row of images of each of FIGS. 6-10 depict the images resulting from the negative change path of FIG. 4, in which closed roads are deleted from the map geometry of the map database 108.

FIG. 6, for example, illustrates a probe data from a geographic region from a first period of time with the first image in the first row labeled Time Slice 1 depicting two substantially perpendicular, straight roadways. The image in the first row labeled Time Slice 2 from a second period of time illustrates additional roadway paths connecting the two straight roadways, in addition to the straight roadways. This may occur, for example, when a highway with a conventional 4-way intersection becomes a limited-access highway and exit/entrance ramps are added to provide increased traffic flow and eliminate a 4-way intersection. The first image in the third column labeled Time Slice 3 represents the probe data from a third period of time, depicting substantially the same probe data as in Time Slice 2.

In the second row of images, the first image labeled "New TS 1-2" depicts the positive changes between the images of Time Slice 1 and Time Slice 2. As shown, the roadways depicted in New TS 1-2 are not fully connected. This may be due to the image processing illustrated in FIG. 4. The second image labeled "New TS 1-3" depicts the positive changes between the images of Time Slice 1 and Time Slice 3. The probe data of Time Slice 3 is more complete and better illustrates the positive changes between Time Slice 1 and Time Slice 3. This may be due to more probe data collected during Time Slice 3, for example. The third image of the second row labeled "New TS 2-3" depicts the positive changes between Time Slice 2 and Time Slice 3. As shown, there are no changes recognized after the image comparison is performed at change detection 314. While there is a change between New TS 1-2 and New TS 1-3, those changes may be fragments that are eliminated through the image processing methods depicted in FIG. 4.

The third row of images of FIG. 6 depicts the negative changes to the roadway geometry. As evident in Time Slice 1, Time Slice 2, and Time Slice 3, there is no probe data in an earlier time period that is not also in a later time period. As such, there are no negative changes to the roadway geometry and no roadways are determined as closed. The images in the third row of FIG. 6 convey this through a display showing no probe data.

FIG. 7 illustrates another example of probe data from a geographic region for changing map geometry. Time Slice 1, the first image in the first row of FIG. 7 illustrates a straight road diagonally across the image, with a spur road along the bottom of the image based on probe data from a first period of time. In Time Slice 2, an exit ramp and an entrance ramp are also depicted accessing the straight road based on new probe data from the second period of time. Similarly, Time Slice 3 illustrates further probe data from a third period of time highlighting the new roadways. In the second row of images, "New TS 1-2" illustrates a portion of the roadways determined to be added to the map geometry based on the differences between the rasterized images of Time Slice 1 and Time Slice 2. "New TS 1-3" illustrates a greater portion of the roadways determined to be added to the map geometry based on the differences between the rasterized images of Time Slice 1 and Time Slice 3. The differences between the rasterized images of Time Slice 2 and Time Slice 3 are negligible such that "New TS 2-3" illustrates no additional roadway geometries. Further, as no probe data in an earlier time period is not also in a later time period, as in FIG. 6, the third row of FIG. 7 depicts no negative changes to the roadway geometry of the geographic region of interest.

FIG. 8 illustrates another example of probe data from a geographic region over three different periods of time representing changing map geometry. As shown in the first row, Time Slice 1 depicts a road extending laterally across the geographic region and an intersecting road along the left side of the image, based on collected probe data from the geographic region. As shown in Time Slice 2, additional probe data shows the same roads with increased probe data density. Time Slice 3 depicts an absence in probe data from the roadway, which extended across the image of the geographic region shown in Time Slice 2, while the probe data from the roadway on the left side of the image is more dense, likely due to re-routing of traffic. The second row of images of FIG. 8 depicts the additional road geometry or new roads interpreted from the image data of Time Slices 1, 2, and 3. As shown, there are no new roads based on the collected probe data, and the second row of images are blank. The third row of images depict the negative changes to the roadway geometry. "Closed TS 1-2" depicts a blank image as there is no negative change in the roadway geometry between Time Slice 1 and Time Slice 2. However, "Closed TS 1-3" illustrates a segment of roadway extending from proximate the left side of the image to the right side of the image as a negative change or road closure. "Closed TS 2-3" illustrates the same road closure. Thus, the negative roadway geometry change is seen in the image delta between Time Slices 1 or 2, and Time Slice 3.

FIG. 9 illustrates yet another example of probe data from a geographic region over three different time periods. The probe data of the first period of time in the first row of images illustrated as Time Slice 1 appears to be the same as the probe data of Time Slices 2 and 3. As such, no changes in probe data are seen between the different periods of time. Therefore, the row of images in the second row representing new roadways, and the row of images in the third row representing closed roadways are each blank, suggesting that there is no probe data supporting either a negative or a positive change to the roadway geometries.

FIG. 10 illustrates a flowchart of a method according to an example embodiment of the present invention. Probe data may be received from a plurality of probes within a predefined geographic region from a first period of time at 610. According to some embodiments, the probe data may be received at a probe data filter without regard for the time of the probe data, the location, or the speed associated with the probe data. In such an instance, the probe data filter may then filter out probe data that is from the relevant geographic region, from the appropriate period of time, and potentially filter out probe data below a predefined speed value. At 620, a first image of the predetermined geographic region may be generated based on the probe data from the first period of time. Probe data from a plurality of probes within the predefined geographic region from a second period of time may be received at 630. A second image of the geographic region may be generated at 640, where the second image is based on the probe data from the second period of time. The first image may be compared to the second image at 650, and a revised route geometry may be generated based on changes detected between the first image and the second image at 660.

In an example embodiment, an apparatus for performing the method of FIG. 10 above may comprise a processor (e.g., the processor 202) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising at least one processor and at least one memory including computer program code, the at least one memory and computer program code configured to, with the processor, cause the apparatus to at least:

receive probe data from a first period of time, wherein the probe data from a first period of time is from a plurality of probes within a predefined geographic region;

generate a first rasterized image of the predefined geographic region based on the probe data from the first period of time;

receive probe data from a second period of time different from the first period of time, wherein the probe data from the second period of time is from a plurality of probes within the predefined geographic region;

generate a rasterized second image of the predefined geographic region based on the probe data from the second period of time, wherein a duration of the at least one first period of time or the second period of time is determined based on a functional class of roadways within the predefined geographic region;

compare the first rasterized image to the second rasterized image to produce a differential image;

perform a connected component analysis on the differential image;

eliminate components from the differential image failing to satisfy the connected component analysis within a predetermined amount; and generate a revised route geometry based on the connected component analysis of the differential image.

2. The apparatus of claim 1, wherein causing the apparatus to generate a revised route geometry based on the connected component analysis of the differential image comprises causing the apparatus to:

eliminate routes appearing on the first image but failing to appear on the second image;

add routes appearing on the second image, but failing to appear on the first image; and retain routes appearing on both the first image and the second image.

3. The apparatus of claim 1, wherein the probe data from the first period of time used to generate the first rasterized image and the probe data from the second period of time used to generate the second rasterized image are each filtered to remove probe data having a speed below a predetermined level.

4. The apparatus of claim 1, further comprising causing the apparatus to perform a morphological image processing function on the rasterized differential image to connect broken clusters of pixels within the rasterized differential image.

5. The apparatus of claim 1, wherein causing the apparatus to generate the first rasterized image based on the probe data from the first period of time comprises causing the apparatus to determine a number of probe data points corresponding to a pixel and causing the apparatus to present the pixel in a first hue in response to the number of probe data points being above a predefined threshold, and causing the apparatus to present the pixel in a second hue in response to the number of probe data points being below the predefined threshold.

6. A method comprising:

receiving probe data from a first period of time, wherein the probe data from a first period of time is from a plurality of probes within a predefined geographic region;

generating a first rasterized image of the predefined geographic region based on the probe data from the first period of time;

receiving probe data from a second period of time different from the first period of time, wherein the probe data from the second period of time is from a plurality of probes within the predefined geographic region;
generating a second rasterized image of the predefined geographic region based on the probe data from the second period of time, wherein a duration of the at least one first period of time or the second period of time is determined based on a functional class of roadways within the predefined geographic region;
comparing the first rasterized image to the second rasterized image to produce a rasterized differential image;
performing a connected component analysis on the rasterized differential image;
eliminating components from the rasterized differential image failing to satisfy the connected component analysis within a predetermined amount; and
generating a revised route geometry based on the connected component analysis of the rasterized differential image.

7. The method of claim 6, wherein generating a revised route geometry based on the connected component analysis of the rasterized differential image comprises:
eliminating routes appearing on the first rasterized image but failing to appear on the second rasterized image;
adding routes appearing on the second rasterized image, but failing to appear on the first rasterized image; and
retaining routes appearing on both the first rasterized image and the second rasterized image.

8. The method of claim 6, wherein the probe data from the first period of time used to generate the first rasterized image and the probe data from the second period of time used to generate the second rasterized image are each filtered to remove probe data having a speed below a predetermined level.

9. The method of claim 6, further comprising performing a morphological image processing function on the rasterized differential image to connect broken clusters of pixels within the rasterized differential image.

10. The method of claim 6, wherein generating the first rasterized image based on the probe data from the first period of time comprises determining a number of probe data points corresponding to a pixel and presenting the pixel in a first hue in response to the number of probe data points being above a predefined threshold, and presenting the pixel in a second hue in response to the number of probe data points being below the predefined threshold.

11. A computer program product comprising at least one non-transitory computer-readable storage medium having computer-executable program code portions stored therein, the computer-executable program code portions comprising program code instructions configured to:
receive probe data from a first period of time, wherein the probe data from a first period of time is from a plurality of probes within a predefined geographic region;
generate a first rasterized image of the predefined geographic region based on the probe data from the first period of time;
receive probe data from a second period of time different from the first period of time, wherein the probe data from the second period of time is from a plurality of probes within the predefined geographic region;
generate a second rasterized image of the predefined geographic region based on the probe data from the second period of time, wherein a duration of the at least one first period of time or the second period of time is determined based on a functional class of roadways within the predefined geographic region;
generate a rasterized differential image between the first rasterized image and the second rasterized image including a delta between the first rasterized image and the second rasterized image;
perform a connected component analysis on the differential image;
eliminate components from the rasterized differential image failing to satisfy the connected component analysis within a predetermined amount;
and
generate a revised route geometry based on the connected component analysis of the rasterized differential image.

12. The computer program product of claim 11, wherein the program code instructions configured to generate a revised route geometry based on the connected component analysis of the rasterized differential image comprises program code instructions configured to:
eliminate routes appearing on the first rasterized image but failing to appear on the second rasterized image;
add routes appearing on the second rasterized image, but failing to appear on the first rasterized image; and
retain routes appearing on both the first rasterized image and the second rasterized image.

13. The computer program product of claim 11, wherein the probe data from the first period of time used to generate the first rasterized image and the probe data from the second period of time used to generate the second rasterized image are each filtered to remove probe data having a speed below a predetermined level.

14. The computer program product of claim 11, further comprising program code instructions to perform a morphological closing image processing function on the differential image to connect broken clusters of pixels wherein the morphological closing image processing function is performed using structured elements of pixel groups, where a size of the structured elements is established based on at least one of the data density, the roadway geometry, or the roadway geometry density.

* * * * *